G. F. BLAKE.

Valve for Direct-Acting Engines.

No. 5,077. Reissued Oct. 1, 1872.

Inventor.
Geo F. Blake

Witnesses.
E. R. Stansbury.
Chas. F. Stansbury
Atty.

AM PHOTO-LITHOGRAPHIC CO. N.Y. (OSBORNE'S PROCESS)

UNITED STATES PATENT OFFICE.

GEORGE F. BLAKE, OF BOSTON, MASSACHUSETTS.

IMPROVEMENT IN VALVES FOR DIRECT-ACTING ENGINES.

Specification forming part of Letters Patent No. 121,320, dated November 28, 1871; reissue No. 5,077, dated October 1, 1872.

*To all whom it may concern:*

Be it known that I, GEORGE F. BLAKE, of Boston, in the county of Suffolk and State of Massachusetts, have invented an Improvement in Valves for Direct-Acting Engines, of which the following is a specification:

My invention consists in arranging a single slide-valve, in combination with suitable ports, in such a manner that the said single slide-valve shall perform the functions both of the main valve and the secondary valve of the engine, when operated substantially as described hereafter.

Figure 2:
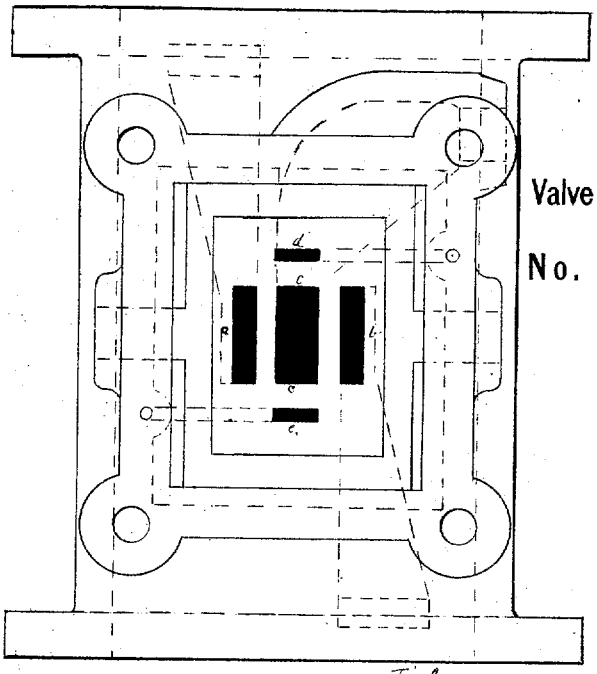
Figure 1:
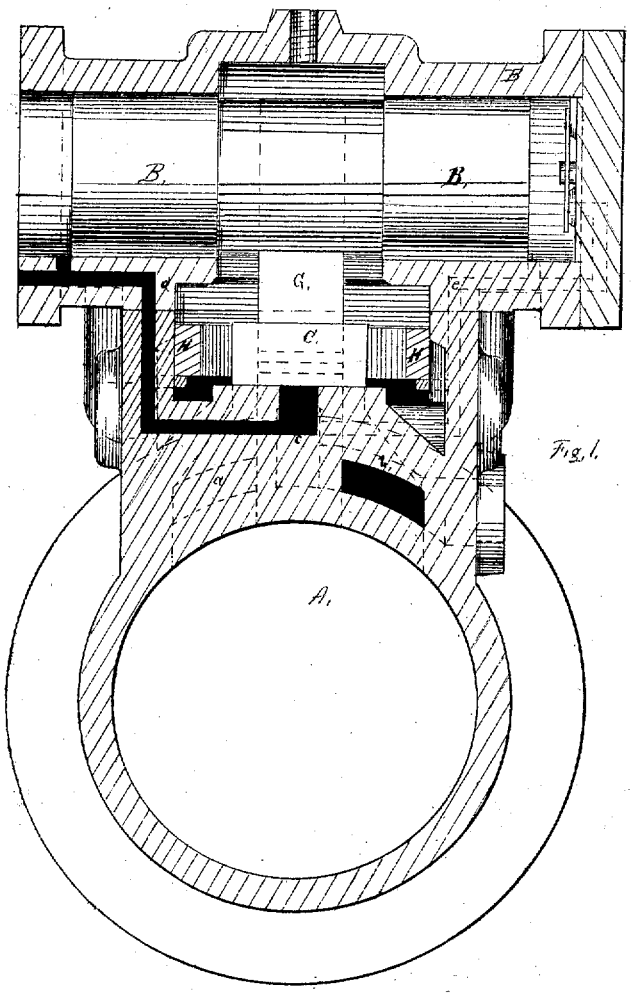
Figure 3:
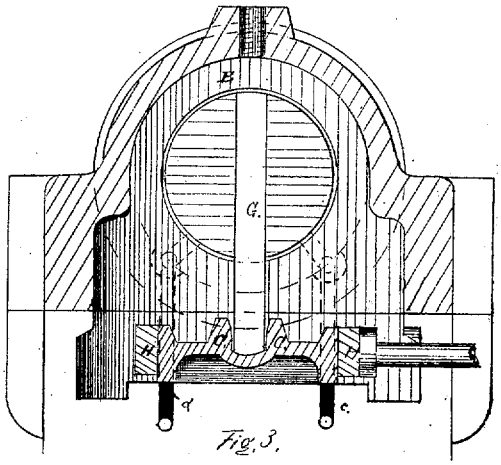

In the drawing accompanying this specification, Figure 1 is a cross-section of the main cylinder and a longitudinal section of the secondary cylinder of an engine arranged for my improved valve; Fig. 2 is a plan of the main cylinder; and Fig. 3 is a cross-section of the secondary cylinder and a longitudinal section of the upper part of the main cylinder.

A is the main cylinder; B, the secondary piston or plunger; C is the slide-valve; E, the secondary cylinder, placed at a right angle to the center line of the main cylinder. The ports *a b* are the leading ports of the engine, and communicate with the ends of the main cylinder and with the slide-valve C, as shown in the plan, Fig. 2. *c* is the main exhaust-port. *d e* are the ports through which steam is conducted to and exhausted from the secondary cylinder. The connection between the secondary piston and the slide-valve is formed by means of the flat pin G, which passes through the plunger and enters the top of the slide-valve in such a manner that the said plunger carries the slide-valve when it moves in the direction of its length, and when the slide-valve is moved by the valve-rod the plunger receives a slight partial rotation. A yoke, H, surrounds the slide-valve C, to which the valve-rod K is rigidly attached. The valve C is free to move in said yoke in the direction of the longitudinal center-line of the plunger, but is confined in and moved by the said yoke, and the valve-rod attached in the direction of the longitudinal center-line of the main cylinder.

In operation, the valve-rod operated by the main piston moves the valve C until steam is let into one end of the secondary cylinder and exhausted from the other through the ports *d e*. This causes the secondary piston or plunger to move the valve C in a direction at a right angle to its previous movement by the valve-rod, (it being free to move within the yoke H,) and reverses the motion of the main piston. In the first movement of the valve C by the valve-rod, the action of the valve on the plunger, by means of the connecting-pin G, gives the plunger a slight partial rotation, so that it is free to move when steam is let on to it and starts more readily than if in a state of rest at that time.

It will be seen that in a full revolution of the engine the valve is moved in four directions: First, in the direction of the longitudinal center-line of the main cylinder by the valve-rod; second, in a direction at a right angle to the direction of the first movement, by means of steam let on to the secondary piston or plunger by the first movement; third, a movement similar to the first, but opposite in direction; fourth, a movement similar to the second, but opposite in direction. Also, by this arrangement of ports and the secondary piston or plunger I am able to operate my engine by combining therewith the single valve C. The arrangement of the secondary piston and its cylinder and the other parts of the engine may be varied, although I prefer the arrangement shown.

I claim as my invention—

1. The slide-valve C, constructed as described, and combined with suitable ports, so that by movement in four directions it acts both as the main valve and the secondary valve of the engine, substantially as set forth.

2. The combination and arrangement of the slide-valve C, rod K, yoke H, ports *a b c d e*, plunger B, and flat pin G, with the main piston of a direct-acting engine, all constructed and operating in the manner and for the purpose specified.

GEO. F. BLAKE.

Witnesses:

JOSEPH B. GARDINER,

F. M. PAUL.